(12) United States Patent
Koshiba et al.

(10) Patent No.: US 12,055,116 B2
(45) Date of Patent: Aug. 6, 2024

(54) ENGINE

(71) Applicant: MITSUBISHI HEAVY INDUSTRIES, LTD., Tokyo (JP)

(72) Inventors: Yuki Koshiba, Tokyo (JP); Masafumi Mori, Tokyo (JP); Kengo Tanaka, Tokyo (JP); Takashi Ueda, Tokyo (JP); Shigetoshi Sugata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/786,412

(22) PCT Filed: Jan. 27, 2021

(86) PCT No.: PCT/JP2021/002710
§ 371 (c)(1),
(2) Date: Jun. 16, 2022

(87) PCT Pub. No.: WO2021/153571
PCT Pub. Date: Aug. 5, 2021

(65) Prior Publication Data
US 2023/0019112 A1  Jan. 19, 2023

(30) Foreign Application Priority Data

Jan. 31, 2020 (JP) ................................. 2020-015408

(51) Int. Cl.
*F02D 41/40* (2006.01)
*F02B 75/28* (2006.01)

(52) U.S. Cl.
CPC ......... *F02D 41/402* (2013.01); *F02D 41/401* (2013.01); *F02B 75/28* (2013.01)

(58) Field of Classification Search
CPC ....................................................... F02D 41/40
See application file for complete search history.

(56) References Cited

U.S. PATENT DOCUMENTS

| 5,996,558 A * | 12/1999 | Ouellette | ............ F02D 19/0689 |
| | | | 123/506 |
| 6,904,893 B2 * | 6/2005 | Hotta | ................... F02M 59/105 |
| | | | 123/457 |

(Continued)

FOREIGN PATENT DOCUMENTS

| JP | 7-208171 A | 8/1995 |
| JP | 2008-534857 A | 8/2008 |
| JP | 2014-156852 A | 8/2014 |

OTHER PUBLICATIONS

International Preliminary Report on Patentability and Written Opinion of the International Searching Authority for International Application No. PCT/JP2021/002710, dated Aug. 11, 2022, with an English translation.

(Continued)

*Primary Examiner* — John Kwon
(74) *Attorney, Agent, or Firm* — Birch, Stewart, Kolasch & Birch, LLP

(57) ABSTRACT

An engine according to an embodiment includes at least one cylinder, at least one piston disposed in the at least one cylinder, a plurality of fuel injection valves disposed on the at least one cylinder, the plurality of fuel injection valves including a first fuel injection valve having a predetermined total hole area and a second fuel injection valve having a total hole area smaller than the total hole area of the first fuel injection valve, and a control device for controlling the first fuel injection valve and the second fuel injection valve according to a load of the engine.

12 Claims, 12 Drawing Sheets

(56) References Cited

U.S. PATENT DOCUMENTS

| | | | |
|---|---|---|---|
| 7,270,108 B2* | 9/2007 | Lemke | F02B 7/02 |
| | | | 123/299 |
| 2006/0219213 A1 | 10/2006 | Lemke | |
| 2015/0184578 A1* | 7/2015 | Oda | F02B 19/18 |
| | | | 123/260 |
| 2016/0169147 A1* | 6/2016 | Surnilla | F02D 41/2461 |
| | | | 123/299 |
| 2019/0152495 A1* | 5/2019 | Altonji | F02D 1/16 |
| 2023/0044405 A1* | 2/2023 | Tanaka | F02D 41/0002 |

OTHER PUBLICATIONS

International Search Report for International Application No. PCT/JP2021/002710, dated Mar. 23, 2021, with English translation.

* cited by examiner

VII — VII

VIII — VIII

FIG. 9A

|  |  | Hole diameter (mm) | Number of holes | Total hole area (mm$^2$) |
|---|---|---|---|---|
| First fuel injection valve | Example 1 | 0.20 | 8 | 0.251 |
| | Example 2 | 0.28 | 4 | 0.251 |

FIG. 9B

|  |  | Hole diameter (mm) | Number of holes | Total hole area (mm$^2$) |
|---|---|---|---|---|
| Second fuel injection valve | Example 1 | 0.20 | 6 | 0.188 |
| | Example 2 | 0.24 | 4 | 0.188 |

FIG. 10

|  | Load | | | | |
|---|---|---|---|---|---|
|  | Idle ~10% | 10%~25% | 25%~50% | 50%~75% | 75%~100% |
| First fuel injection valve | – | – | Activated | Activated | Activated |
| Second fuel injection valve | Activated | Activated | Activated | Activated | Activated |

FIG. 11

| | | Total hole area (mm²) | Cylinder total hole area (mm²) | Load | | | | | |
|---|---|---|---|---|---|---|---|---|---|
| | | | | Idle ~10% | 10%~20% | 20%~30% | 30%~40% | 40%~100% |
| First cylinder | First fuel injection valve (1-1 fuel injection valve) | 0.25 | 0.43 | - | - | - | - | Activated |
| | Second fuel injection valve (1-2 fuel injection valve) | 0.18 | | - | Activated | Activated | Activated | Activated |
| Second cylinder | First fuel injection valve (2-1 fuel injection valve) | 0.24 | 0.41 | - | - | - | Activated | Activated |
| | Second fuel injection valve (2-2 fuel injection valve) | 0.17 | | Activated | Activated | Activated | Activated | Activated |
| Third cylinder | First fuel injection valve (3-1 fuel injection valve) | 0.23 | 0.39 | - | - | Activated | Activated | Activated |
| | Second fuel injection valve (3-2 fuel injection valve) | 0.16 | | Activated | Activated | Activated | Activated | Activated |

ENGINE

TECHNICAL FIELD

The present disclosure relates to an engine.

BACKGROUND

For example, in a direct-injection diesel engine, in general, one fuel injection valve per cylinder is disposed and fuel is injected into the cylinder by the fuel injection valve (see, for example, Patent Document 1).

CITATION LIST

Patent Literature

Patent Document 1: JP2014-156852A

SUMMARY

Technical Problem

In general, it is desired that an engine has the highest thermal efficiency under rated conditions, that is, at high load. Thus, for example, it is conceivable to improve the thermal efficiency by shortening a combustion period at high load. Therefore, it is conceivable to shorten a fuel injection period by increasing a hole area in the fuel injection valve. However, if the hole area in the fuel injection valve is increased, a fuel injection amount at low load may increase more than necessary, which may lead to deterioration in thermal efficiency.

In view of the above, an object of at least one embodiment of the present disclosure is to improve the thermal efficiency of the engine under a wide range of operating conditions from low load to high load.

Solution to Problem (1) An engine according to at least one embodiment of the present disclosure includes at least one cylinder, at least one piston disposed in the at least one cylinder, a plurality of fuel injection valves disposed on the at least one cylinder, the plurality of fuel injection valves including a first fuel injection valve having a predetermined total hole area and a second fuel injection valve having a total hole area smaller than the total hole area of the first fuel injection valve, and a control device for controlling the first fuel injection valve and the second fuel injection valve according to a load of the engine.

(2) An engine according to at least one embodiment of the present disclosure includes at least one cylinder, a first piston disposed in the at least one cylinder, a second piston disposed in the same cylinder as the cylinder where the first piston is disposed, the second piston being disposed opposite to the first piston, a plurality of fuel injection valves disposed on the at least one cylinder, the plurality of fuel injection valves including a first fuel injection valve and a second fuel injection valve, and a control device for controlling the first fuel injection valve and the second fuel injection valve. The control device is configured to control the first fuel injection valve and the second fuel injection valve such that fuel is injected from both the first fuel injection valve and the second fuel injection valve at high load of the engine, and control the first fuel injection valve and the second fuel injection valve such that fuel injection from the first fuel injection valve is stopped and the fuel is injected from the second fuel injection valve at low load of the engine.

Advantageous Effects

According to at least one embodiment of the present disclosure, it is possible to improve thermal efficiency of an engine under a wide range of operating conditions from low load to high load.

BRIEF DESCRIPTION OF DRAWINGS

FIG. 9A is a table regarding injection holes of a first fuel injection valve according to some embodiments.

FIG. 9B is a table regarding injection holes of a second fuel injection valve according to some embodiments.

FIG. 10 is a table showing an example of a relationship between a load of the engine and an activated fuel injection valve.

FIG. 11 is a table showing an example of a relationship between a load of the engine shown in FIG. 2 and the activated fuel injection valve.

DETAILED DESCRIPTION

Figure 1:
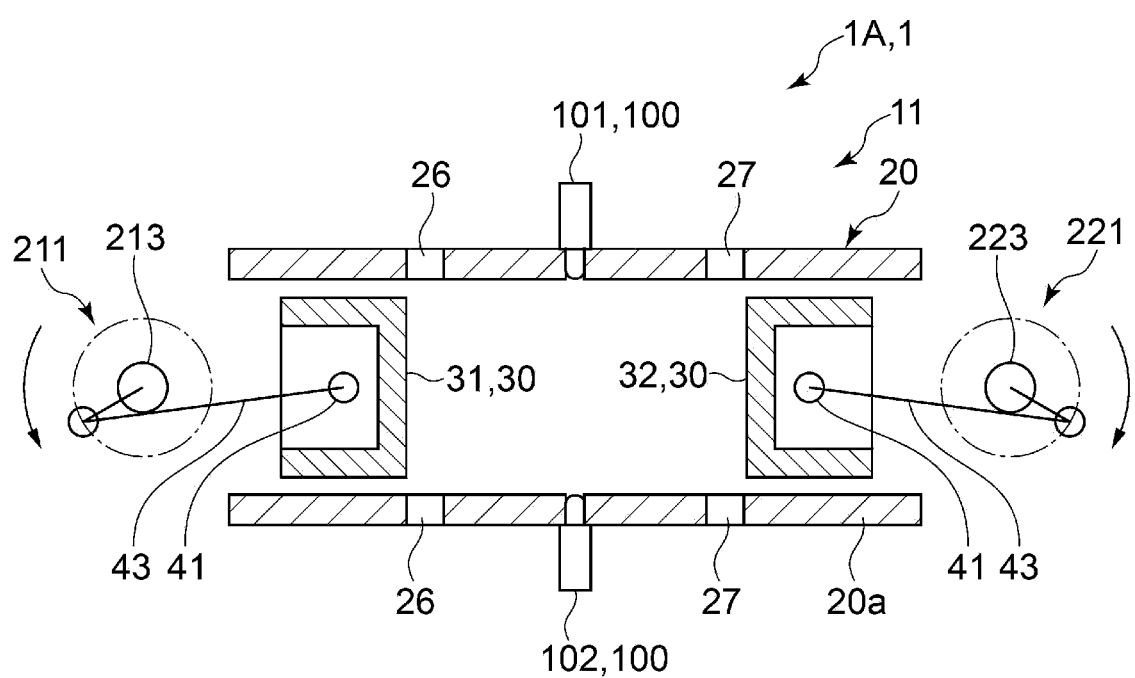
FIG. 1 is a cross-sectional view schematically showing the configuration of an engine according to an embodiment.

Embodiments of the present disclosure will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Overall Configuration

Figure 2:
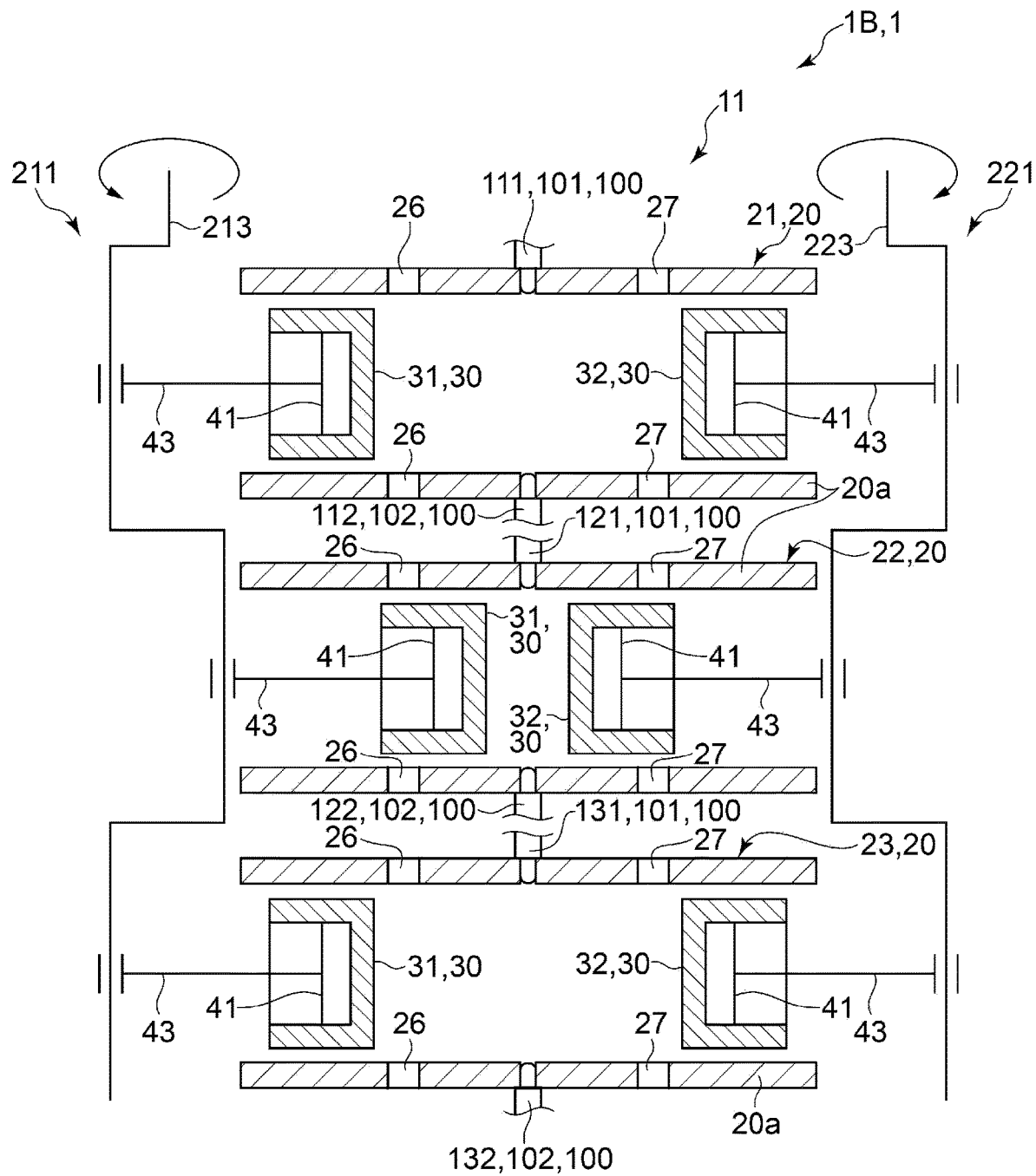
FIG. 2 is a cross-sectional view schematically showing the configuration of an engine according to another embodiment.
Figure 3:
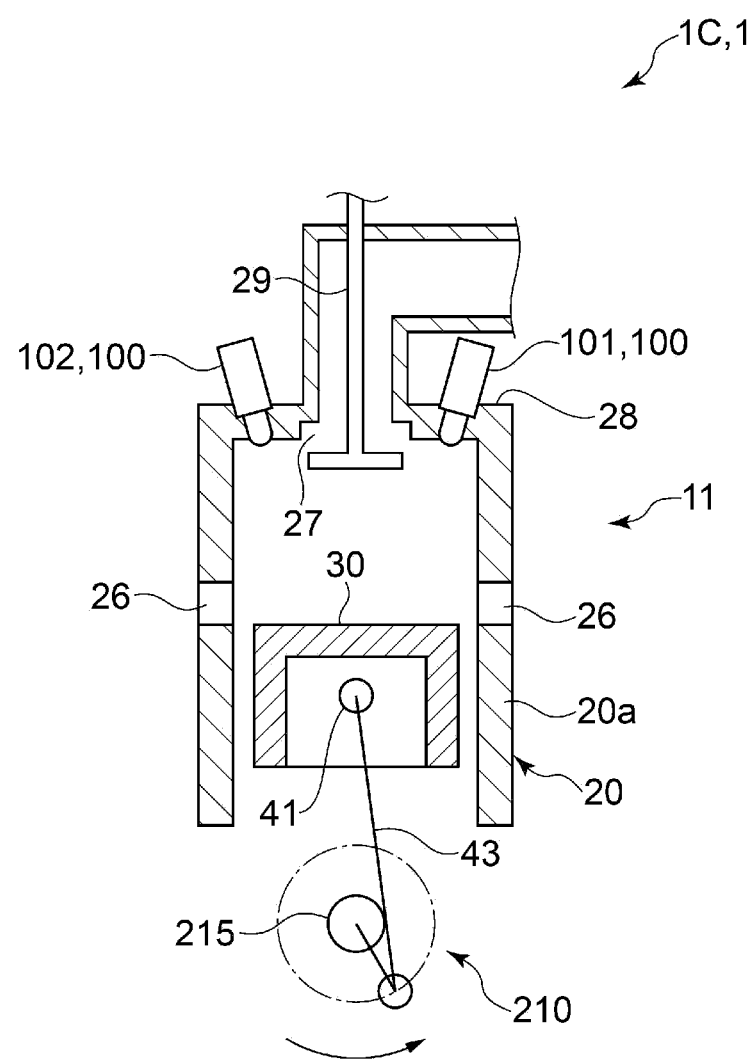
FIG. 3 is a cross-sectional view schematically showing the configuration of an engine according to still another embodiment.
Figure 4:
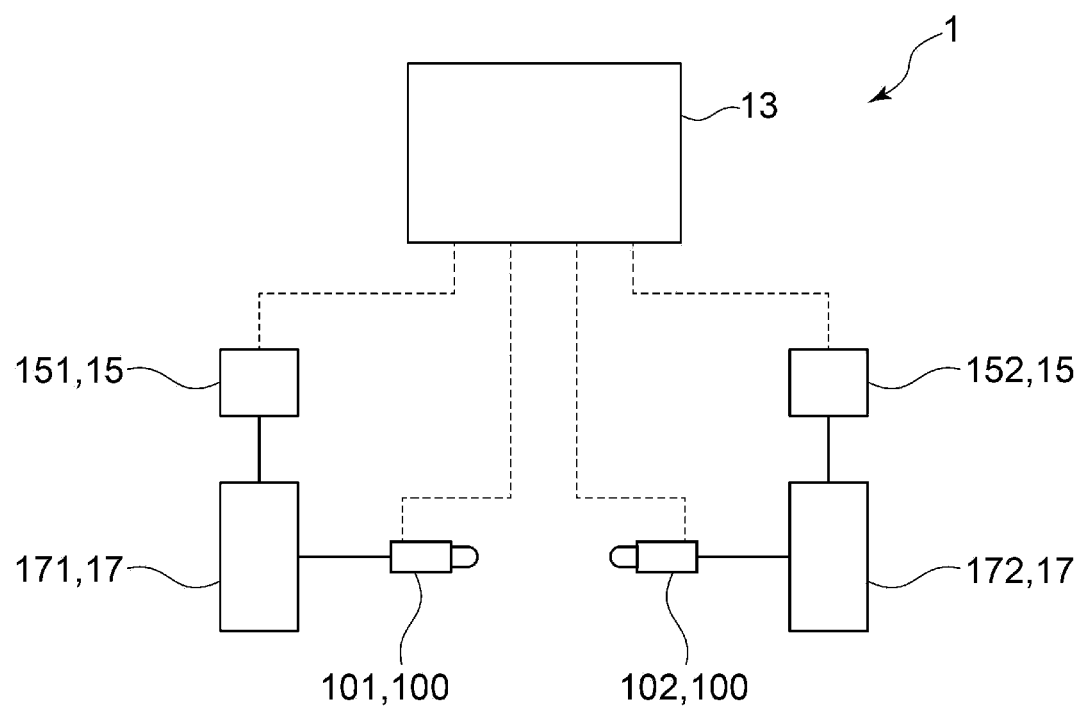
FIG. 4 is a diagram showing the configuration regarding a fuel injection system of the engine shown in FIGS. 1 and 3.
Figure 5:
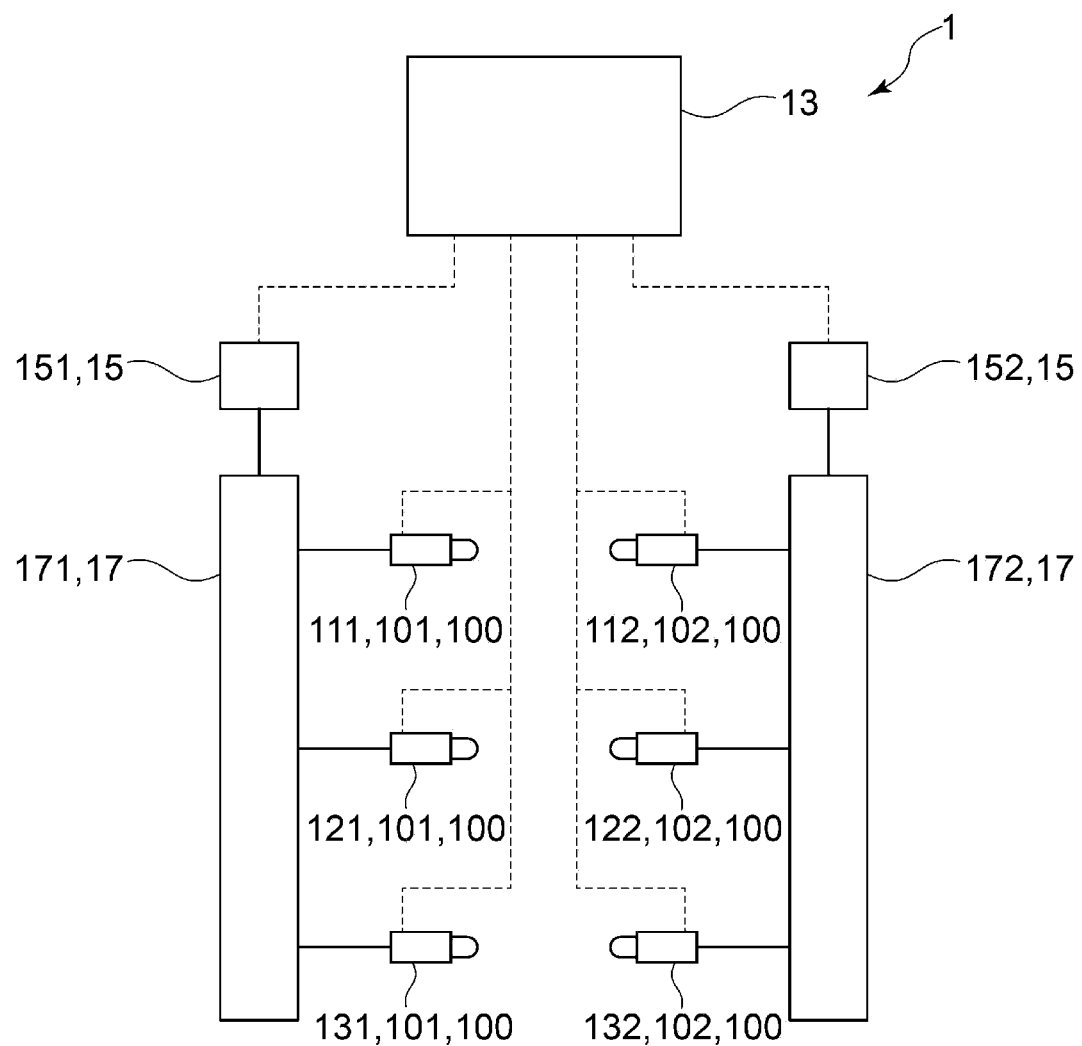
FIG. 5 is a diagram showing the configuration regarding a fuel injection system of the engine shown in FIG. 2.

FIG. 1 is a cross-sectional view schematically showing the configuration of an engine according to an embodiment. FIG. 2 is a cross-sectional view schematically showing the configuration of an engine according to another embodiment. FIG. 3 is a cross-sectional view schematically showing the configuration of an engine according to still another embodiment. FIG. 4 is a diagram showing the configuration regarding a fuel injection system of the engine shown in FIGS. 1 and 3. FIG. 5 is a diagram showing the configuration regarding a fuel injection system of the engine shown in FIG. 2.

As shown in FIGS. 1 to 5, an engine 1 according to some embodiments includes an engine body 11, a control device (ECU) 13, a fuel pump 15, a common rail 17, and a fuel injection valve 100.

The control device 13 is a control device for controlling each part of the engine 1.

The fuel pump 15 is a pump for supplying fuel to the engine 1.

The common rail 17 is a pressure accumulation device for accumulating the fuel supplied from the fuel pump 15 at a predetermined supply pressure.

The fuel injection valve 100 is a fuel injection device for injecting the fuel supplied from the common rail 17 into a cylinder 20 in the engine body 11.

As shown in FIGS. 1 to 3, the engine 1 according to some embodiments includes the at least one cylinder 20, and at least one piston 30 disposed in the above-described at least one cylinder 20.

As shown in FIGS. 1 to 3, in the engine 1 according to some embodiments, the fuel injection valve 100 is a plurality of fuel injection valves 100 disposed on the above-described at least one cylinder 20, and includes a first fuel injection valve 101 having a predetermined total hole area and a second fuel injection valve 102 having a total hole area (second total hole area Sa2) smaller than the total hole area (first total hole area Sa1) of the first fuel injection valve 101. The fuel injection valve 100 is configured to open only while receiving a valve opening signal from the control device 13 to be able to inject the supplied fuel.

As shown in FIGS. 4 and 5, the common rail 17 according to some embodiments includes a first common rail 171 for supplying fuel to the first fuel injection valve 101, and a second common rail 172 for supplying fuel to the second fuel injection valve 102.

Further, the fuel pump 15 according to some embodiments includes a first fuel pump 151 for supplying fuel to the first common rail 171, and a second fuel pump 152 for supplying fuel to the second common rail 172.

The control device 13 shown in FIGS. 4 and 5 is configured to control the first fuel injection valve 101 and the second fuel injection valve 102 according to a load of the engine 1. The control contents in the control device 13 according to some embodiments will be described in detail later.

Regarding Engine 1A, 1B

An engine 1A shown in FIG. 1 and an engine 2B shown in FIG. 2 are each, for example, an opposed-piston engine, and in each of the above-described at least one cylinder 20, a pair of pistons 30 are disposed in the same cylinder 20 and are configured to move in an opposite direction along the axial direction of the cylinder 20. That is, in the engine 1 shown in FIGS. 1 and 2, the above-described at least one piston 30 includes a first piston 31, and a second piston 32 which is disposed in the same cylinder 20 as the cylinder 20, where the first piston 31 is disposed, and is disposed opposite to the first piston 31.

For example, the engine 1A shown in FIG. 1 is a single-cylinder opposed-piston engine having one cylinder. For example, the engine 1B shown in FIG. 2 is a multi-cylinder opposed-piston engine having three cylinders. The engine 1A shown in FIG. 1 and the engine 2B shown in FIG. 2 are each, for example, a uniflow type two-stroke diesel engine. The engine 1B shown in FIG. 2 includes three cylinders, but may include two or not less than four cylinders.

In the engine 1 shown in FIGS. 1 and 2, the first piston 31 is connected to one end of a connecting rod 43 via a piston pin 41, and another end of the connecting rod 43 is connected to a first crankshaft 211.

Likewise, the second piston 32 is connected to one end of the connecting rod 43 via the piston pin 41, and the another end of the connecting rod 43 is connected to a second crankshaft 221.

In the engine 1 shown in FIGS. 1 and 2, the piston 31 and the second piston 32 reciprocate in the cylinder 20 in synchronization with each other by a rotation of the first crankshaft 211 about a first output shaft 213 and a rotation of the second crankshaft 221 about a second output shaft 223.

In the engine 1 shown in FIGS. 1 and 2, at least one scavenging port 26 is formed in a peripheral wall 20a of each cylinder 20 on axially one side of each cylinder 20, and at least one exhaust port 27 is formed in the peripheral wall 20a of each cylinder 20 on axially another side of each cylinder 20.

In the engine 1 shown in FIGS. 1 and 2, a plurality of scavenging ports 26 and exhaust ports 27 are disposed in the circumferential direction of each cylinder 20.

In the engine 1 shown in FIGS. 1 and 2, the fuel injection valve 100 is disposed on the peripheral wall 20a of each cylinder 20. In the engine 1 shown in FIGS. 1 and 2, for example, the first fuel injection valve 101 and the second fuel injection valve 102 are disposed to be displaced in the circumferential direction so as to be opposite to each other across an axial center of each cylinder 20 (the center of a radial cross-section in each cylinder 20).

In the following description, three cylinders 20 in an engine 1B shown in FIG. 2 will also be referred to as a first cylinder 21, a second cylinder 22, and a third cylinder 23 in order from one side along an extension direction of the first crankshaft 211 and the second crankshaft 221.

Regarding Engine 1C

An engine 1C shown in FIG. 3 is, for example, a uniflow type two-stroke diesel engine where one piston 30 is disposed in one cylinder 20. For example, the engine 1 shown in FIG. 3 is a single-cylinder engine having one cylinder, but may be a multi-cylinder engine having not less than two cylinders.

In the engine 1C shown in FIG. 3, the piston 30 is connected to the one end of the connecting rod 43 via the piston pin 41, and the another end of the connecting rod 43 is connected to a crankshaft 210.

In the engine 1C shown in FIG. 3, the piston 30 reciprocates in the cylinder 20 by a rotation of the crankshaft 210 about an output shaft 215.

In the engine 1C shown in FIG. 3, the at least one scavenging port 26 is formed in the peripheral wall 20a of the cylinder 20 on the axially one side (bottom dead center side) of the cylinder 20, and the at least one exhaust port 27 is formed in a cylinder head 28 disposed on the axially another side (top dead center side) of the cylinder 20.

In the engine 1C shown in FIG. 3, the plurality of scavenging ports 26 are disposed in the circumferential direction of the cylinder 20. In the engine 1C shown in FIG. 3, opening/closing of the exhaust port 27 is controlled by an exhaust valve 29.

In the engine 1C shown in FIG. 3, for example, the fuel injection valve 100 is disposed on the cylinder head 28. In the engine 1C shown in FIG. 3, for example, the first fuel injection valve 101 and the second fuel injection valve 102 are disposed to be displaced in the circumferential direction so as to be opposite to each other across the axial center of the cylinder 20.

Fuel Injection Valve 100

Figure 6:
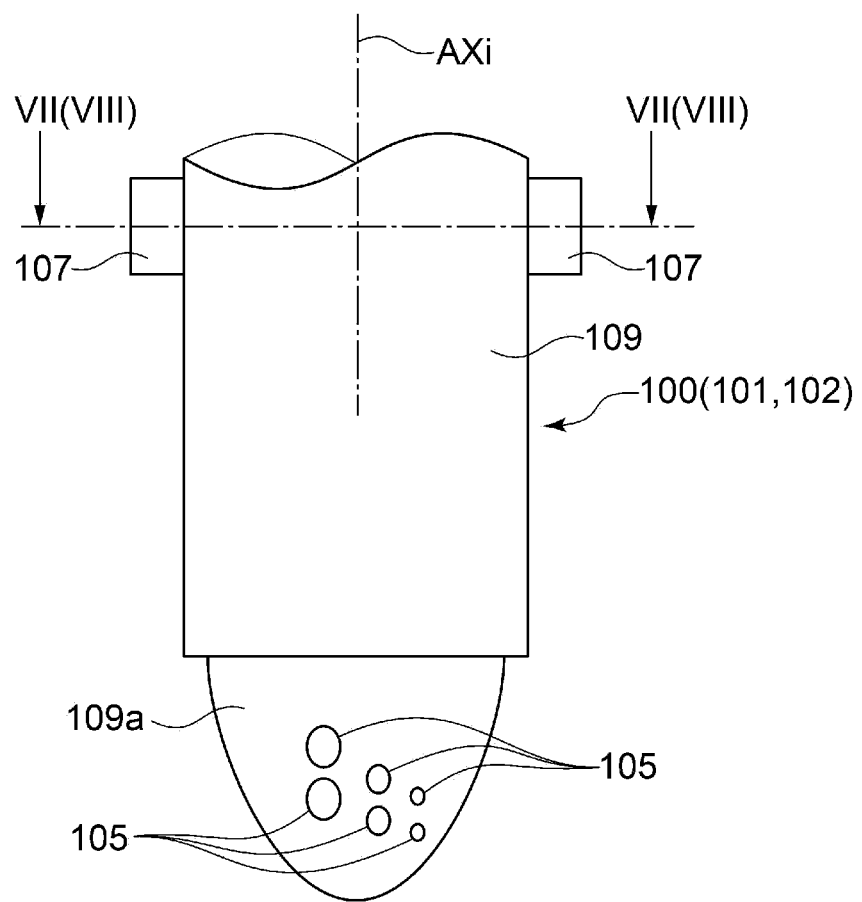
FIG. 6 is a schematic appearance view of a fuel injection valve according to some embodiments.

FIG. 6 is a schematic appearance view of the fuel injection valve according to some embodiments. In FIG. 6, illustration of a proximal end side of a body of the fuel injection valve is omitted.

Figure 7:
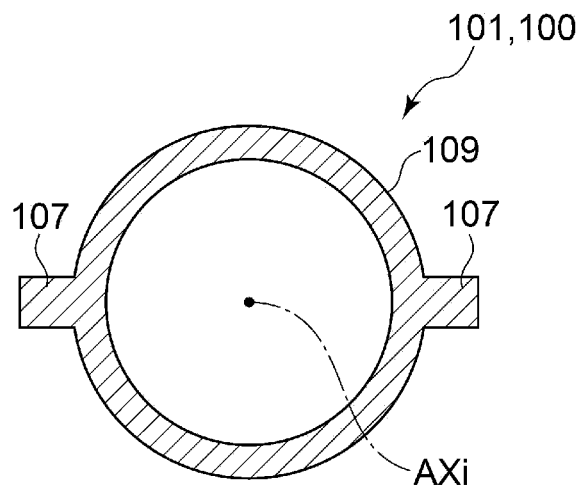
FIG. 7 is a cross-sectional view taken along line VII-VII in FIG. 6.

FIG. 7 is a cross-sectional view taken along line VII-VII in FIG. 6. FIG. 7 is a view showing an example of a cross-section in a case where the fuel injection valve is the first fuel injection valve.

Figure 8:
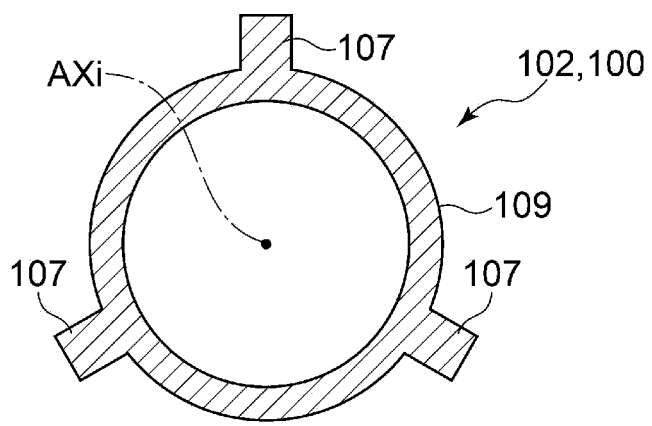
FIG. 8 is a cross-sectional view taken along line VIII-VIII in FIG. 6.

FIG. 8 is a cross-sectional view taken along line VIII-VIII in FIG. 6. FIG. 8 is a view showing an example of a cross-section in a case where the fuel injection valve is the second fuel injection valve.

In some embodiments shown in FIGS. 1 to 5, as shown in FIG. 6, the first fuel injection valve 101 and the second fuel injection valve 102 each have injection holes 105 for injecting fuel into the cylinder 20. In each of the first fuel injection valve 101 and the second fuel injection valve 102, for example, the plurality of injection holes 105 are formed in a tip portion 109a of a body 109 of the fuel injection valve 100.

The positions and the number of disposed injection holes 105 are not limited to those illustrated.

Further, in FIG. 6, the hole diameters of the plurality of injection holes 105 are not the same, but may be the same.

Fitting protrusions 107 are formed on an outer peripheral surface of the body 109. In the fuel injection valve 100 according to some embodiments, for example, the fitting protrusions 107 are provided to define an angular position in the circumferential direction about an axis AXi of the body 109 with respect to the cylinder 20. In the fuel injection valve 100 according to some embodiments, the fitting protrusions 107 are each fitted with a corresponding one of fitting recesses (not shown) formed in the peripheral wall 20a of the cylinder 20 or the cylinder head 28, thereby defining the above-described angular position.

Further, in the fuel injection valve 100 according to some embodiments, for example, as shown in FIGS. 7 and 8, the form of the fitting protrusions 107 is different between the first fuel injection valve 101 and the second fuel injection valve 102. For example, as shown in FIGS. 7 and 8, the number of fitting protrusions 107, the angular position in the circumferential direction about the axis AXi of the body 109, or the like may be different between the first fuel injection valve 101 and the second fuel injection valve 102. Thus, it is possible to prevent the first fuel injection valve 101 and the second fuel injection valve 102 from being mistakenly assembled in assembly of the engine 1.

The fitting protrusions 107 and the fitting recesses (not shown) shown in FIGS. 6 to 8 are given as an example of a configuration for defining the angular position in the circumferential direction about the axis AXi of the body 109 with respect to the cylinder 20, or for preventing the mistake in assembly between the first fuel injection valve 101 and the second fuel injection valve 102. Therefore, the configuration for defining the angular position in the circumferential direction about the axis AXi of the body 109 with respect to the cylinder 20, or for preventing the mistake in assembly between the first fuel injection valve 101 and the second fuel injection valve 102 is not limited to the above-described configuration.

Regarding Total Hole Area

FIG. 9A is a table regarding the injection holes of the first fuel injection valve according to some embodiments.

FIG. 9B is a table regarding the injection holes of the second fuel injection valve according to some embodiments.

In the fuel injection valve 100 according to some embodiments, it is possible to change a total hole area Sa, which is a total value of areas s of the individual injection holes 105, by changing at least one of the diameter of the injection hole 105 or the number of injection holes 105.

For example, focusing on "Example 1" shown in FIGS. 9A and 9B, the first fuel injection valve 101 and the second fuel injection valve 102 have the same hole diameter, but with a difference in number of holes, the total hole area Sa is different between the first fuel injection valve 101 and the second fuel injection valve 102.

Further, for example, focusing on "Example 2" shown in FIGS. 9A and 9B, the first fuel injection valve 101 and the second fuel injection valve 102 are the same in number of holes, but with a difference in hole diameter, the total hole area Sa is different between the first fuel injection valve 101 and the second fuel injection valve 102.

The contents shown in FIGS. 9A and 9B are merely examples, and the hole diameter, the number of holes, the total hole area Sa, the combination of the hole diameter and the number of holes, or the like is not limited to the illustrated contents. Further, by making both the hole diameter and the number of holes different between the first fuel injection valve 101 and the second fuel injection valve 102, the total hole area Sa may be different between the first fuel injection valve 101 and the second fuel injection valve 102.

With the engine 1 according to some embodiments shown in FIGS. 1 to 5, since it is possible to control the first fuel injection valve 101 and the second fuel injection valve 102 according to the load of the engine 1, that is, a required fuel injection amount, it is possible to appropriately set any of the fuel injection valves 100 to inject fuel and a fuel injection time according to the required fuel injection amount. Thus, it is possible to improve thermal efficiency of the engine 1 under a wide range of operating conditions from low load to high load.

Further, according to the engines 1A and 1B shown in FIGS. 1 and 2, in the opposed-piston engine in which the two pistons 30 are disposed opposite to each other in the same cylinder 20, it is possible to improve the thermal efficiency of the engines 1A and 1B under the wide range of operating conditions from low load to high load.

More specifically, for example, fuel is injected from only one of the first fuel injection valve 101 or the second fuel injection valve 102 at low load, making it possible to further lengthen the fuel injection period as compared to a case where fuel is injected from both the first fuel injection valve 101 and the second fuel injection valve 102.

Further, as will be described later, for example, even under operating conditions where the load is low, it is possible to further lengthen the fuel injection period by injecting fuel from the second fuel injection valve 102 having the smaller total hole area Sa without injecting fuel from the first fuel injection valve 101, under operating conditions where the load is lower such as when idling.

Advantages of lengthening the fuel injection period at low load are as follows.

In general, it is desired that an engine has the highest thermal efficiency under rated conditions, that is, at high load. Thus, for example, it is conceivable to improve the thermal efficiency by improving the degree of constant volume through shortening of a combustion period at high load. Therefore, it is conceivable to shorten a fuel injection period by increasing the hole area (total hole area Sa) in the fuel injection valve. However, if the hole area in the fuel injection valve is increased, a fuel injection amount at low load may increase more than necessary, which may lead to deterioration in thermal efficiency.

However, if the fuel injection period is shortened in order to reduce the fuel injection amount at low load, a fuel spray distance becomes short. Consequently, fuel is injected in the vicinity of the fuel injection valve, which may cause combustion failure. Further, if the fuel injection period is shortened, it is impossible to sufficiently secure a movement time of a valve body in the fuel injection valve, which may result in an insufficient lift amount of the valve body. If the lift amount of the valve body is insufficient, that is, if the valve body is not fully lifted in the fuel injection valve, a fuel injection amount for each fuel injection cycle may change each time. Thus, a spray state becomes unstable and the combustion state becomes unstable.

Therefore, by lengthening the fuel injection period at low load, it is possible to stabilize the spray state to stabilize the combustion state while suppressing excessive fuel injection.

Further, for example, it is conceivable that even under operating conditions where the load is low, the fuel injection period is originally relatively long under operating conditions where the load is relatively high, and thus a demand for further lengthening may not be so high. In such a case, it is also conceivable to inject fuel from the first fuel injection valve 101 having the larger total hole area Sa without injecting fuel from the second fuel injection valve 102. Thus, it is possible to shorten the fuel injection period and to shorten the combustion period as compared to the case where fuel is injected from the second fuel injection valve 102 without injecting fuel from the first fuel injection valve 101, making it possible to improve thermal efficiency.

As described above, with the engine 1 according to some embodiments shown in FIGS. 1 to 5, it is possible to improve the thermal efficiency of the engine 1 under the wide range of operating conditions from low load to high load by appropriately setting any of the fuel injection valves 101 and 102 to inject fuel and the fuel injection time according to the required fuel injection amount.

Hereinafter, the control contents in the control device 13 according to some embodiments will further be described.

In some embodiments, the control device 13 is configured to control the first fuel injection valve 101 and the second fuel injection valve 102 such that fuel is injected from both the first fuel injection valve 101 and the second fuel injection valve 102 at high load (for example, at first load) of the engine 1. Further, in some embodiments, the control device 13 is configured to control the first fuel injection valve 101 and the second fuel injection valve 102 such that fuel injection from the first fuel injection valve 101 is stopped and fuel is injected from the second fuel injection valve 102 at low load (for example, at second load lower than the first load) of the engine 1.

FIG. 10 is a table showing an example of a relationship between the load of the engine and the activated fuel injection valve.

As shown in FIG. 10, in some embodiments, the control device 13 controls the first fuel injection valve 101 so as to activate the first fuel injection valve 101 at high load and so as not to activate the first fuel injection valve 101 at low load, with reference to, for example, a load where the magnitude of the load of the engine 1 is 25%. The numerical value indicating the magnitude of the load of the engine 1 is represented with the maximum output in the engine 1 being 100%.

More specifically, in some embodiments, for example, if the magnitude of the load of the engine 1 changes from low load to high load, the control device 13 is preferably configured to perform control so to activate the first fuel injection valve 101 when the magnitude of the load becomes, for example, several percent higher than 25%. Further, in some embodiments, for example, if the magnitude of the load of the engine 1 changes from high load to low load, the control device 13 is preferably configured to perform control so as not to activate the first fuel injection valve 101 when the magnitude of the load becomes, for example, several percent lower than 25%.

That is, in some embodiments, the control device 13 preferably has a hysteresis regarding switching between activation and deactivation of the fuel injection valve 100, when the load of the engine 1 changes from low load to high load or from high load to low load.

In the following description, it is assumed that the hysteresis is provided with regard to the switching between activation and deactivation of the fuel injection valve 100.

The above description was given assuming that activation and deactivation of the first fuel injection valve 101 are switched with reference to the load magnitude of 25%. However, the numerical value of 25% is an example, and activation and deactivation of the first fuel injection valve 101 may be switched with reference to the load magnitude of other than 25%, for example, 40%, 50%, or the like.

As shown in FIG. 10, in some embodiments, the control device 13 controls the second fuel injection valve 102 so as to activate the second fuel injection valve 102 regardless of, for example, the magnitude of the load of the engine 1.

In the engine 1B shown in FIG. 2, activation or deactivation of the first fuel injection valve 101 (1-1 fuel injection valve 111) and the second fuel injection valve 102 (1-2 fuel injection valve 112) in the first cylinder 21 may be switched as shown in the table of FIG. 10. In the engine 1B shown in FIG. 2, activation or deactivation of the first fuel injection valve 101 (2-1 fuel injection valve 121) and the second fuel injection valve 102 (2-2 fuel injection valve 122) in the second cylinder 22 may be switched as shown in the table of FIG. 10. In the engine 1B shown in FIG. 2, activation or deactivation of the first fuel injection valve 101 (3-1 fuel injection valve 131) and the second fuel injection valve 102 (3-2 fuel injection valve 132) in the third cylinder 23 may be switched as shown in the table of FIG. 10.

In the following description, the first total hole area Sa1 in the 1-1 fuel injection valve 111 will also be referred to as a 1-1 total hole area Sa1A. Likewise, the second total hole area Sa2 in the 1-2 fuel injection valve 112 will also be referred to as a 1-2 total hole area Sa2A.

In the following description, the first total hole area Sa1 in the 2-1 fuel injection valve 121 will also be referred to as a 2-1 total hole area Sa1B. Likewise, the second total hole area Sa2 in the 2-2 fuel injection valve 122 will also be referred to as a 2-2 total hole area Sa2B.

In the following description, the first total hole area Sa1 in the 3-1 fuel injection valve 131 will also be referred to as a 3-1 total hole area Sa1C. Likewise, the second total hole area Sa2 in the 3-2 fuel injection valve 132 will also be referred to as a 3-2 total hole area Sa2C.

As described above, in some embodiments, the control device 13 may be configured to control the operation and the non-operation of the fuel injection valve 100 with reference to, for example, a control map as shown in FIG. 10.

According to some embodiments, since fuel is injected from both the first fuel injection valve 101 and the second fuel injection valve 102 at high load, it is possible to shorten the fuel injection period as compared to the case where fuel is injected from one of the first fuel injection valve 101 or the second fuel injection valve 102, and since it is possible to shorten the combustion period, it is possible to improve thermal efficiency.

According to some embodiments, since fuel is injected from the second fuel injection valve 102 without injecting fuel from the first fuel injection valve 101 at low load, it is possible to lengthen the fuel injection period as compared to the case where fuel is injected from both the first fuel injection valve 101 and the second fuel injection valve 102. Further, since fuel is injected from the second fuel injection valve 102 having the smaller total hole area Sa without injecting fuel from the first fuel injection valve 101, it is possible to further lengthen the fuel injection period as compared to the case where fuel is injected from the first fuel injection valve 101 having the larger total hole area Sa without injecting fuel from the second fuel injection valve 102. Thus, by lengthening the fuel injection period at low load, it is possible to further stabilize the spray state to further stabilize the combustion state while suppressing excessive fuel injection.

In some embodiments, if it is configured such that activation or deactivation of the first fuel injection valve 101 and the second fuel injection valve 102 is switched as shown in the table of FIG. 10, the control device 13 is preferably configured to increase an injection pressure of the second fuel injection valve 102 at high load relative to at low load.

The injection pressure of the fuel injection valve 100 depends on a rail pressure which is a pressure of fuel in the common rail 17.

Thus, the control device 13 is preferably configured to control the second fuel pump 152 such that the rail pressure of the second common rail 172 becomes a first pressure at high load, with reference to the magnitude of the load for switching activation or deactivation of the first fuel injection valve 101, for example. Further, the control device 13 is preferably configured to control the second fuel pump 152 such that the rail pressure of the second common rail 172 becomes a second pressure lower than the first pressure at low load, with reference to the magnitude of the load for switching activation or deactivation of the first fuel injection valve 101, for example.

As described above, the second fuel injection valve 102 has the second total hole area Sa2 smaller than the first total hole area Sa1 of the first fuel injection valve 101. Thus, if the injection pressure, that is, a fuel supply pressure to the fuel injection valve 100 is the same between the first fuel injection valve 101 and the second fuel injection valve 102, a fuel injection amount from the second fuel injection valve 102 per unit time is smaller than a fuel injection amount from the first fuel injection valve 101 per unit time.

Thus, by increasing the injection pressure of the second fuel injection valve 102 at high load relative to at low load, it is possible to suppress a difference between the fuel injection amount from the second fuel injection valve 102 per unit time and the fuel injection amount from the first fuel injection valve 101 per unit time at high load. Therefore, it becomes easy to secure the required fuel injection amount at high load.

FIG. 11 is a table showing an example of a relationship between the load of the engine shown in FIG. 2 and the activated fuel injection valve. FIG. 11 also describes the total hole area Sa of the respective fuel injection valves 100 in the engine 1B shown in FIG. 2, and a cylinder total hole area ΣS which is a sum of the first total hole area Sa1 of the first fuel injection valve 101 and the second total hole area Sa2 of the second fuel injection valve 102 in each cylinder 20.

For example, in the engine 1B shown in FIG. 2, a threshold of the magnitude of the load for switching between activation and deactivation of the first fuel injection valve 101 is different for each cylinder 20, but the control device 13 is configured to control the first fuel injection valve 101 and the second fuel injection valve 102 such that fuel is injected from both the first fuel injection valve 101 and the second fuel injection valve 102 in any cylinder 20 at high load of the engine 1B. Further, the control device 13 is configured to control the first fuel injection valve 101 and the second fuel injection valve 102 such that fuel injection from the first fuel injection valve 101 is stopped and, for example, fuel is injected from the second fuel injection valve 102 in the second cylinder 22 and the third cylinder 23 at low load of the engine 1B in any cylinder 20.

For example, upon controlling the fuel injection in the engine 1B shown in FIG. 2, the control device 13 performs control so as to stop activation in order from the fuel injection valve 100 having the large total hole area Sa, as the load of the engine 1B decreases.

That is, the control device 13 controls the respective fuel injection valves 100 so as to activate all the fuel injection valves 100 at high load and so as not to activate at least the 1-1 fuel injection valve 111 in the first cylinder 21 at low load, for example, with reference to a load where the magnitude of the load of the engine 1B is 40%. The first total hole area Sa1 of the 1-1 fuel injection valve 111 is the largest among the plurality of fuel injection valves 100 in the engine 1B.

The control device 13 controls the respective fuel injection valves 100 so as not to further activate at least the 2-1 fuel injection valve 121 in the second cylinder 22 at low load, with reference to a load where the load of the engine 1B is further decreased and, for example, the magnitude of the load of the engine 1B becomes 30%. The first total hole area Sa1 of the 2-1 fuel injection valve 121 is the second largest after the first total hole area Sa1 of the 1-1 fuel injection valve 111 among the plurality of fuel injection valves 100 in the engine 1B.

The control device 13 controls the respective fuel injection valves 100 so as not to further activate at least the 3-1 fuel injection valve 131 in the third cylinder 23 at low load, with reference to a load where the load of the engine 1B is further decreased and, for example, the magnitude of the load of the engine 1B becomes 20%. The first total hole area Sa1 of the 3-1 fuel injection valve 131 is the second largest after the first total hole area Sa1 of the 2-1 fuel injection valve 121 among the plurality of fuel injection valves 100 in the engine 1B.

The control device 13 controls the respective fuel injection valves 100 so as not to further activate at least the 1-2 fuel injection valve 112 in the first cylinder 21 at low load, with reference to a load where the load of the engine 1B is further decreased and, for example, the magnitude of the load of the engine 1B becomes 10%. The second total hole area Sa2 of the 1-2 fuel injection valve 112 is the second largest after the first total hole area Sa1 of the 3-1 fuel injection valve 131 among the plurality of fuel injection valves 100 in the engine 1B.

Thus, for example, at low load, activation of not only the first fuel injection valve 101 but also the second fuel injection valve 102 may be stopped to halt the cylinder 20. That is, there may be the cylinder 20 that does not perform combustion.

If the load of the engine 1B increases, the control device 13 performs control so as to activate the fuel injection valve 100, which has been prevented from being activated, in a reverse order of the above-described order.

As described above, in some embodiments, the control device 13 may be configured to control the operation and the non-operation of the fuel injection valve 100 with reference to, for example, the control map as shown in FIG. 11.

In the engine 1B shown in FIG. 2, the above-described at least one cylinder 20 includes at least two cylinders 20. In the engine 1B shown in FIG. 2, the above-described at least one cylinder 20 includes three cylinders 20, as an example. Then, the control device 13 is preferably configured to control the first fuel injection valve 101 and the second fuel injection valve 102 in each of the above-described at least two cylinders 20, according to the load of the engine 1B shown in FIG. 2.

Thus, in the engine 1B including the at least two cylinders 20, it is possible to improve thermal efficiency of the engine 1B under the wide range of operating conditions from low load to high load.

Further, the above-described at least two cylinders 20 are preferably configured such that the cylinder total hole area ΣS, which is the sum of the total hole area (first total hole area Sa1) of the first fuel injection valve 101 and the total hole area (second total hole area Sa2) of the second fuel injection valve 102, is different for each cylinder 20.

Thus, upon controlling the first fuel injection valve 101 and the second fuel injection valve 102 according to the load of the engine 1B in each of the cylinders 20, as described above, it is possible to diversify the control contents of the first fuel injection valve 101 and the second fuel injection valve 102 as compared to a case where the cylinder total hole area Sa is the same for each cylinder 20. Thus, it is possible to improve thermal efficiency of the engine 1B under the wide range of operating conditions from low load to high load.

In the engine 1B shown in FIG. 2, the control device 13 is preferably configured to perform control so as to decide on any of the first fuel injection valve 101 and the second fuel injection valve 102 in each of the above-described at least two cylinders 20 to inject fuel or to stop injecting fuel, according to the load of the engine 1B.

As a result, the number of cylinders each in which the first fuel injection valve 101 and the second fuel injection valve 102 are to be controlled increases, making it possible to diversify the control contents of the first fuel injection valve 101 and the second fuel injection valve 102. Therefore, it is possible to improve thermal efficiency of the engine 1B under the wide range of operating conditions from low load to high load.

The control contents of the control device 13 when controlling the fuel injection in the engine 1B shown in FIG. 2 are summarized as follows.

That is, in the engine 1B shown in FIG. 2, as shown in FIG. 11, the one cylinder 20 (for example, the first cylinder 21) of the above-described at least two cylinders 20 includes the first fuel injection valve (for example, the 1-1 fuel injection valve 111) having the first total hole area (for example, the 1-1 total hole area Sa1A), and the second fuel injection valve (for example, the 1-2 fuel injection valve 112) having the second total hole area (for example, the 1-2 total hole area Sa2A) smaller than the first total hole area.

The another cylinder (for example, the second cylinder 22) of the above-described at least two cylinders 20 includes the third fuel injection valve (for example, the 2-1 fuel injection valve 121) having the third total hole area (for example, the 2-1 total hole area Sa1B) smaller than the first total hole area, and the fourth fuel injection valve (for example, the 2-2 fuel injection valve 122) having the fourth total hole area (for example, the 2-2 total hole area Sa2B) smaller than the third total hole area.

Then, the control device 13 is configured to control the respective fuel injection valves 100 such that, for example, fuel is injected from at least both the 1-1 fuel injection valve 111 and the 2-1 fuel injection valve 121 at high load of the engine 1B (for example, at high load with reference to the load where the magnitude of the load of the engine 1B is 40%).

Further, the control device 13 is configured to control the respective fuel injection valves 100 such that, for example, fuel injection from the 1-1 fuel injection valve 111 is stopped and fuel is injected from at least the 2-1 fuel injection valve 121 at low load of the engine 1B (for example, at low load with reference to the load where the magnitude of the load of the engine 1B is 40%).

Thus, as the load of the engine 1B decreases, by sequentially stopping activation from the fuel injection valve 100 having the larger total hole area Sa regardless of to which cylinder 20 the fuel injection valve 100 belongs, the activated fuel injection valve 100 is the fuel injection valve 100 having the relatively small total hole area. Thus, it becomes easy to secure the fuel injection period of the fuel injection valve 100 even at low load.

Regarding Rail Pressure Control

Figure 12A:
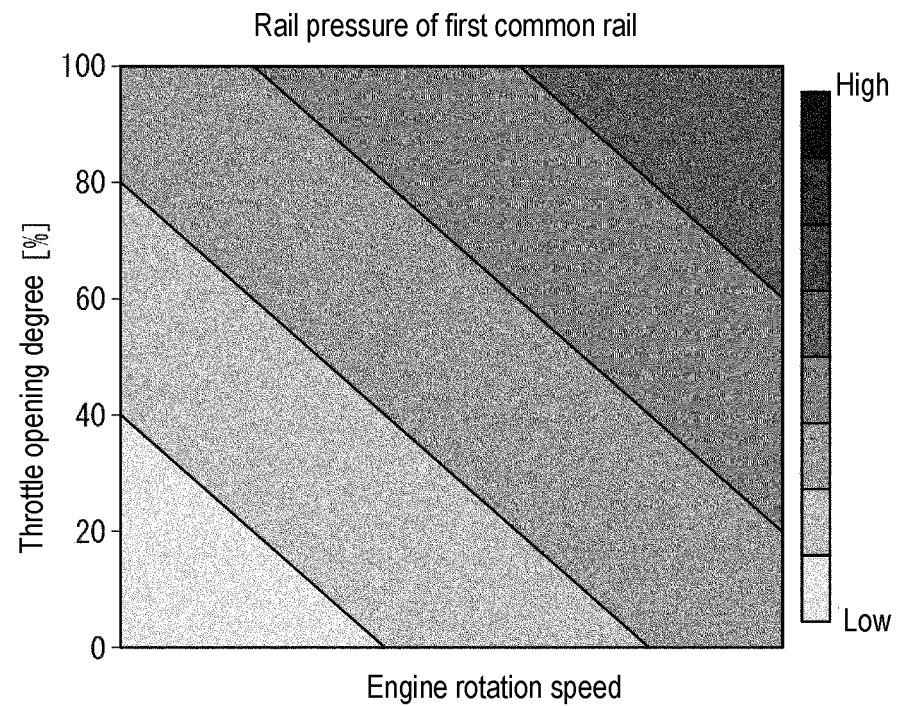
FIG. 12A is an example of a control map for a rail pressure of a first common rail.

FIG. 12A is an example of the control map for the rail pressure of the first common rail.

Figure 12B:
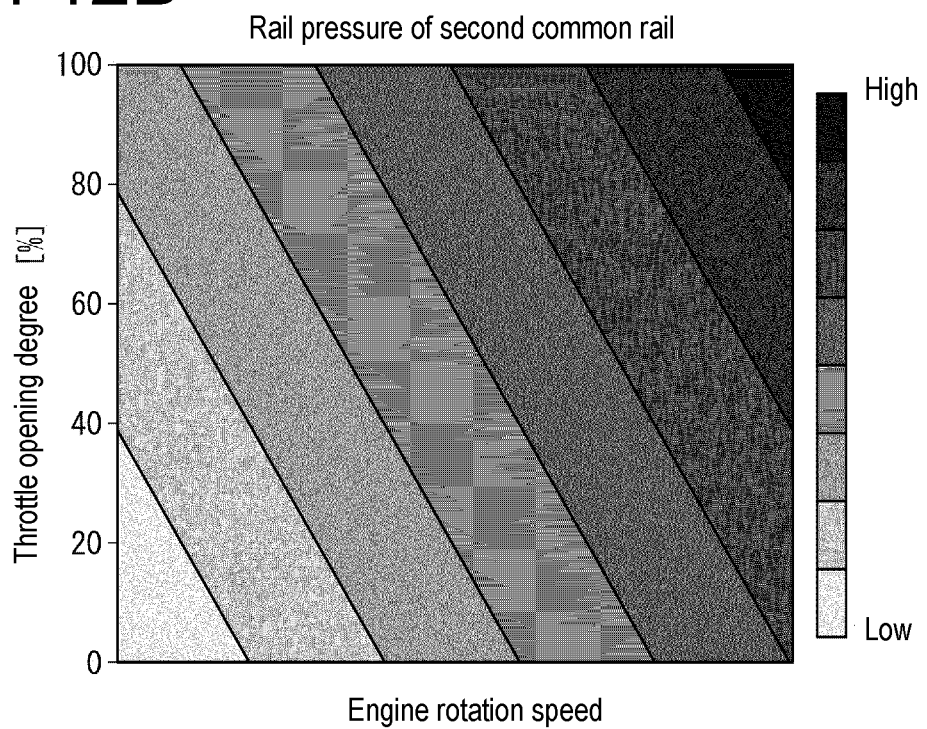
FIG. 12B is an example of a control map for a rail pressure of a second common rail.

FIG. 12B is an example of the control map for the rail pressure of the second common rail.

In some embodiments, the control device 13 is configured to increase the injection pressures of the first fuel injection valve 101 and the second fuel injection valve 102, and is preferably configured such that the injection pressure of the second fuel injection valve 102 is higher than the injection pressure of the first fuel injection valve 101 at high load, as the load of the engine 1 increases.

More specifically, for example, as shown in FIG. 12A, the control device 13 is preferably configured to control the first fuel pump 151 to increase the rail pressure of the first common rail 171, as an engine speed increases or a throttle opening increases.

Further, for example, as shown in FIG. 12B, the control device 13 is preferably configured to control the second fuel pump 152 to increase the rail pressure of the second common rail 172, as the engine speed increases or the throttle opening increases.

The load of the engine 1 depends on the engine speed and the throttle opening.

The control device 13 may be configured to control the first fuel pump 151 and the second fuel pump 152 such that the rail pressure of the second common rail 172 is higher than the rail pressure of the first common rail 171.

Thus, since the injection pressures of the first fuel injection valve 101 and the second fuel injection valve 102 increase as the load of the engine 1 increases, it becomes easy to secure the required fuel injection amount even at higher load.

As described above, the second fuel injection valve 102 has the second total hole area Sa2 smaller than the first total hole area Sa1 of the first fuel injection valve 101. Thus, if the injection pressure, that is, the fuel supply pressure to the fuel injection valve 100 is the same between the first fuel injection valve 101 and the second fuel injection valve 102, the fuel injection amount from the second fuel injection valve 102 per unit time is smaller than the fuel injection amount from the first fuel injection valve 101 per unit time.

Thus, by causing the injection pressure of the second fuel injection valve 102 to be higher than the injection pressure of the first fuel injection valve 101 at high load, it is possible to suppress the difference between the fuel injection amount from the second fuel injection valve 102 per unit time and the fuel injection amount from the first fuel injection valve 101 per unit time at high load. Therefore, it becomes easy to secure the required fuel injection amount at high load.

Regarding Fuel Injection Timing

Figure 13:
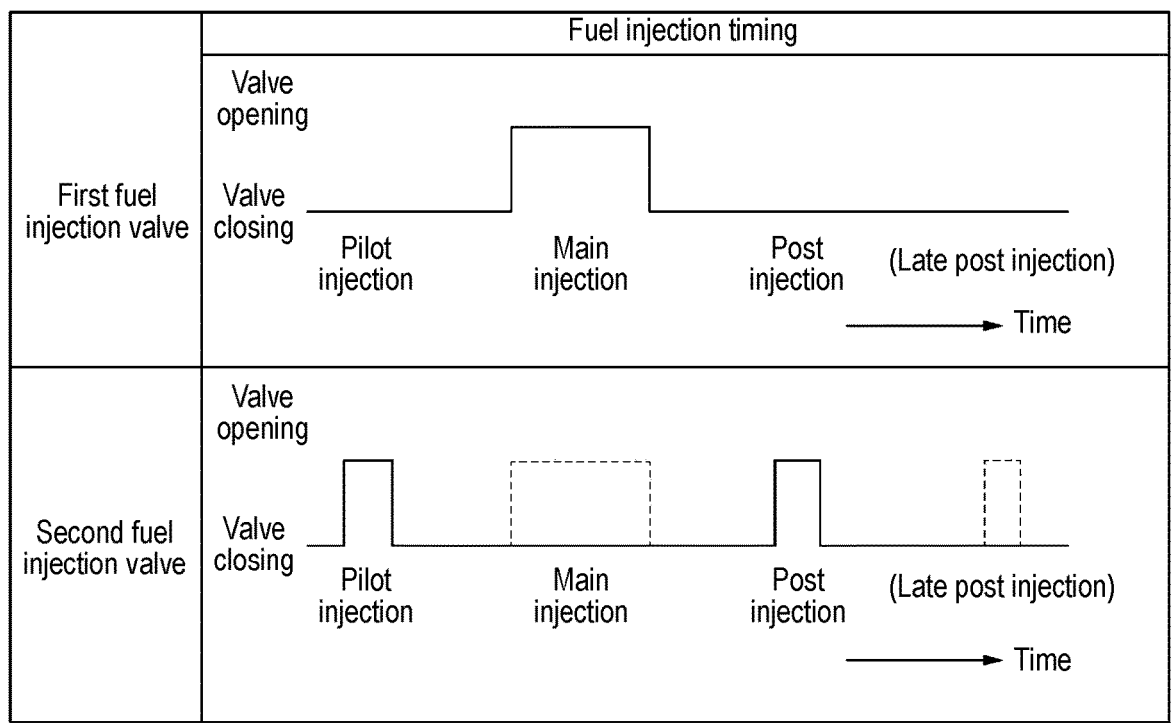
FIG. 13 is a view showing an example of fuel injection timings in the first fuel injection valve and the second fuel injection valve.

FIG. 13 is a view showing an example of fuel injection timings in the first fuel injection valve and the second fuel injection valve.

In general, the fuel injection valve 100 having the relatively large total hole area Sa has a larger penetration force of sprayed fuel than the fuel injection valve 100 having the relatively small total hole area Sa. Therefore, at a fuel injection timing when a relatively large fuel penetration force is required, it is preferable to activate the fuel injection valve 100 having the relatively large total hole area Sa. Further, at a fuel injection timing when relatively uniform atomization is required, it is preferable to activate the fuel injection valve 100 having the relatively small total hole area Sa.

Thus, for example, when performing multi-stage injection which is often performed in a diesel engine, a fuel spray state may be optimized at each fuel injection timing by properly using the fuel injection valves 100 having different total hole areas Sa.

For example, in a case where pilot injection, which requires relatively uniform atomization, is performed when performing the multi-stage injection which is often performed in the diesel engine, the control device 13 may control the operations of the first fuel injection valve 101 and the second fuel injection valve 102 so as to deactivate the first fuel injection valve 101 and to activate the second fuel injection valve 102. The pilot injection is fuel injection performed prior to main injection for the purpose of, for example, achieving good initial ignition.

For example, when performing the main injection which requires the relatively large fuel penetration force, the control device 13 preferably controls the operations of the first fuel injection valve 101 and the second fuel injection valve 102 so as to activate the first fuel injection valve 101 and to deactivate the second fuel injection valve 102, and may control the operations of the first fuel injection valve 101 and the second fuel injection valve 102 so as to activate the first fuel injection valve 101 and the second fuel injection valve 102. Further, for example, in a case where the main injection is performed, as in some embodiments described above, the control device 13 may control the operations of the first fuel injection valve 101 and the second fuel injection valve 102 so as to deactivate the first fuel injection valve 101 and to activate the second fuel injection valve 102.

For example, in a case where post injection, which requires relatively uniform atomization, is performed, the control device 13 may control the operations of the first fuel injection valve 101 and the second fuel injection valve 102 so as to deactivate the first fuel injection valve 101 and to activate the second fuel injection valve 102. The post injection is fuel injection performed after the main injection for the purpose of, for example, purifying an exhaust gas.

For example, in a case where late-post injection, which requires relatively uniform atomization, is performed, the control device 13 may control the operations of the first fuel injection valve 101 and the second fuel injection valve 102 so as to deactivate the first fuel injection valve 101 and to activate the second fuel injection valve 102. The late-post injection is fuel injection performed at a timing that does not contribute to combustion in a combustion chamber after the main injection for the purpose of, for example, raising a temperature of a catalyst for purifying the exhaust gas.

Thus, in some embodiments, the control device 13 is preferably configured to perform control so as to decide on the any fuel injection valve 100 of the first fuel injection valve 101 and the second fuel injection valve 102 to inject fuel, according to the fuel injection timing.

Thus, for example, as described above, when performing the multi-stage injection which is often performed in the diesel engine, the fuel injection valve 100 having the more appropriate total hole area Sa can be selected according to the fuel injection timing, making it possible to obtain the appropriate fuel spray state at each fuel injection timing.

In the above description, the case where the second total hole area Sa2 in the second fuel injection valve 102 is smaller than the first total hole area Sa1 in the first fuel injection valve 101 has been described. However, the first total hole area Sa1 in the first fuel injection valve 101 and the second total hole area Sa2 in the second fuel injection valve 102 may be the same.

That is, for example, the engine 1A or 1B shown in FIG. 1 or 2 may include the at least one cylinder 20, the first piston 31 disposed in the above-described at least one cylinder 20, and the second piston 32 which is disposed in the same cylinder 20 as the cylinder 20, where the first piston 31 is disposed, and is disposed opposite to the first piston 31. The engine 1A or the engine 1B shown in FIG. 1 or 2 preferably includes the plurality of fuel injection valves 100 which are disposed on the above-described at least one cylinder 20, and include the first fuel injection valve 101 and the second fuel injection valve 102. The engine 1A or the engine 1B shown in FIG. 1 or 2 preferably includes the control device 13 for controlling the first fuel injection valve 101 and the second fuel injection valve 102.

Herein, the control device 13 is preferably configured to control the first fuel injection valve 101 and the second fuel injection valve 102 such that fuel is injected from both the first fuel injection valve 101 and the second fuel injection valve 102 at high load of the engine 1. Further, the control device 13 is preferably configured to control the first fuel injection valve 101 and the second fuel injection valve 102 such that fuel injection from the first fuel injection valve 101 is stopped and fuel is injected from the second fuel injection valve 102 at low load of the engine 1.

Thus, since fuel is injected from both the first fuel injection valve 101 and the second fuel injection valve 102 at high load of the engine 1, it is possible to shorten the fuel injection period as compared to the case where fuel is injected from one of the first fuel injection valve 101 or the second fuel injection valve 102, and since it is possible to shorten the combustion period, it is possible to improve thermal efficiency.

Further, since fuel is injected from the second fuel injection valve 102 without injecting fuel from the first fuel injection valve 101 at low load of the engine 1, it is possible to lengthen the fuel injection period as compared to the case where fuel is injected from both the first fuel injection valve 101 and the second fuel injection valve 102. Thus, by lengthening the fuel injection period at low load of the engine 1, it is possible to stabilize the spray state to stabilize the combustion state while suppressing excessive fuel injection.

In particular, in the opposed-piston engine such as the engine 1A or the engine 1B shown in FIG. 1 or 2, since the fuel injection valve 100 has to be disposed on a lateral side of the cylinder 20, a distance between the fuel injection valve 100 and the axial center of the cylinder 20 increases as compared to, for example, the engine 1C as shown in FIG. 3 which is not the opposed-piston engine. Thus, in the opposed-piston engine, as compared to the engine which is not the opposed-piston engine, fuel hardly reaches the axial center of the cylinder 20 at low load, which may cause a combustion failure.

Therefore, as described above, by reducing the number of fuel injection valves 100 activated at low load, the injection period is lengthened to secure the penetration force of fuel and fuel is supplied to the axial center side of the cylinder 20. Thus, it is possible to stabilize combustion at low load.

The present disclosure is not limited to the above-described embodiments, and also includes an embodiment obtained by modifying the above-described embodiments and an embodiment obtained by combining these embodiments as appropriate.

For example, in the engine 1B shown in FIG. 2, in the case where the total hole areas Sa of the respective fuel injection valves 100 are in the magnitude relationship as shown in FIG. 11, even the first fuel injection valve 101 (3-1 fuel injection valve 131) having the smallest first total hole area Sa1 has the total hole area (for example, 0.23 mm$^2$) which is larger than the second total hole area (for example, 0.18 mm$^2$) of the second fuel injection valve 102 (1-2 fuel injection valve 112) having the largest second total hole area Sa2. That is, in the engine 1B shown in FIG. 2, in the case where the total hole areas Sa of the respective fuel injection valves 100 are in the magnitude relationship as shown in FIG. 11, all the first fuel injection valves 101 have the larger total hole areas Sa than any second fuel injection valves 102. However, in the engine 1B shown in FIG. 2, there may be the first fuel injection valve 101 having the smaller total hole area Sa than any of the second fuel injection valves 102.

In some embodiments described above, the number of fuel injection valves 100 for each cylinder 20 is two, but the number of fuel injection valves 100 for each cylinder 20 may be not less than three.

The contents described in the above embodiments would be understood as follows, for instance.

(1) An engine 1 according to at least one embodiment of the present disclosure includes at least one cylinder 20, and at least one piston 30 disposed in the above-described at least one cylinder 20. The engine 1 according to at least one embodiment of the present disclosure includes a plurality of fuel injection valves 100 disposed on the above-described at least one cylinder 20, the plurality of fuel injection valves 100 including a first fuel injection valve 101 having a predetermined total hole area Sa and a second fuel injection valve 102 having a total hole area Sa smaller than the total hole area Sa of the first fuel injection valve 101. The engine 1 according to at least one embodiment of the present disclosure includes a control device 13 for controlling the first fuel injection valve 101 and the second fuel injection valve 102 according to a load of the engine 1.

With the above configuration (1), since it is possible to control the first fuel injection valve 101 and the second fuel injection valve 102 according to the load of the engine 1, that is, a required fuel injection amount, it is possible to appropriately set any of the fuel injection valves 100 to inject fuel and a fuel injection time according to the required fuel injection amount.

Thus, it is possible to improve thermal efficiency of the engine 1 under the wide range of operating conditions from low load to high load.

Further, by lengthening the fuel injection period at low load, it is possible to stabilize the spray state to stabilize the combustion state while suppressing excessive fuel injection.

(2) In some embodiments, in the above configuration (1), the control device 13 is configured to control the first fuel injection valve 101 and the second fuel injection valve 102 such that fuel is injected from both the first fuel injection valve 101 and the second fuel injection valve 102 at high load of the engine 1. The control device 13 is preferably configured to control the first fuel injection valve 101 and the second fuel injection valve 102 such that fuel injection from the first fuel injection valve 101 is stopped and the fuel is injected from the second fuel injection valve 102 at low load of the engine 1.

With the above configuration (2), since fuel is injected from both the first fuel injection valve 101 and the second fuel injection valve 102 at high load, it is possible to shorten the fuel injection period as compared to the case where fuel is injected from one of the first fuel injection valve 101 or the second fuel injection valve 102, and since it is possible to shorten the combustion period, it is possible to improve thermal efficiency.

With the above configuration (2), since fuel is injected from the second fuel injection valve 102 without injecting fuel from the first fuel injection valve 101 at low load, it is possible to lengthen the fuel injection period as compared to the case where fuel is injected from both the first fuel injection valve 101 and the second fuel injection valve 102. Further, since fuel is injected from the second fuel injection valve 102 having the smaller total hole area Sa without injecting fuel from the first fuel injection valve 101, it is possible to further lengthen the fuel injection period as compared to the case where fuel is injected from the first fuel injection valve 101 having the larger total hole area Sa without injecting fuel from the second fuel injection valve 102. Thus, by lengthening the fuel injection period at low load, it is possible to further stabilize the spray state to further stabilize the combustion state while suppressing excessive fuel injection.

(3) In some embodiments, in the above configuration (2), the control device 13 is preferably configured to increase an injection pressure of the second fuel injection valve 102 at the high load relative to at the low load.

As described above, the second fuel injection valve 102 has the total hole area Sa smaller than the total hole area Sa of the first fuel injection valve 101. Thus, if the injection pressure, that is, the fuel supply pressure to the fuel injection valve 100 is the same between the first fuel injection valve 101 and the second fuel injection valve 102, the fuel injection amount from the second fuel injection valve 102 per unit time is smaller than the fuel injection amount from the first fuel injection valve 101 per unit time.

With the above configuration (3), since the injection pressure of the second fuel injection valve 102 is higher at the high load relative to at the low load, it is possible to suppress a difference between the fuel injection amount from the second fuel injection valve 102 per unit time and the fuel injection amount from the first fuel injection valve 101 per unit time at high load. Therefore, it becomes easy to secure the required fuel injection amount at high load.

(4) In some embodiments, in any one of the above configurations (1) to (3), the above-described at least one cylinder 20 includes at least two cylinders 20. Then, the above-described at least two cylinders 20 are configured such that a cylinder total hole area ΣS, which is a sum of the total hole area Sa of the first fuel injection valve 101 and the total hole area Sa of the second fuel injection valve 102, is different for each of the cylinders 20.

With the above configuration (4), upon controlling the first fuel injection valve 101 and the second fuel injection valve 102 according to the load of the engine 1 in each of the two cylinders 20, it is possible to diversify the control contents of the first fuel injection valve 101 and the second fuel injection valve 102 as compared to the case where the cylinder total hole area ΣS is the same for each of the cylinders 20. Thus, it is possible to improve thermal efficiency of the engine 1 under the wide range of operating conditions from low load to high load.

(5) In some embodiments, in the above configuration (1), the above-described at least one cylinder 20 includes at least two cylinders 20. Then, the control device 13 is configured to control the first fuel injection valve 101 and the second fuel injection valve 102 in each of the above-described at least two cylinders 20, according to the load.

With the above configuration (5), in the engine 1 including the at least two cylinders 20, it is possible to improve thermal efficiency of the engine 1 under the wide range of operating conditions from low load to high load.

(6) In some embodiments, in the above configuration (5), the control device 13 is configured to perform control so as to decide on any of the first fuel injection valve 101 and the second fuel injection valve 102 in each of the above-described at least two cylinders 20 to inject fuel or to stop injecting fuel, according to the load.

With the above configuration (6), the number of cylinders each in which the first fuel injection valve 101 and the second fuel injection valve 102 are to be controlled increases, making it possible to diversify the control contents of the first fuel injection valve 101 and the second fuel injection valve 102. Thus, it is possible to improve thermal efficiency of the engine 1 under the wide range of operating conditions from low load to high load.

(7) In some embodiments, in the above configuration (5) or (6), the control device 13 is configured to increase injection pressures of the first fuel injection valve 101 and the second fuel injection valve 102 as the load increases, and is configured to cause the injection pressure of the second fuel injection valve 102 to be higher than the injection pressure of the first fuel injection valve 101 at high load.

With the above configuration (7), since the injection pressures of the first fuel injection valve 101 and the second fuel injection valve 102 increase as the load increases, it becomes easy to secure the required fuel injection amount even at higher load.

As described above, the second fuel injection valve 102 has the total hole area Sa smaller than the total hole area Sa of the first fuel injection valve 101. Thus, if the injection pressure, that is, the fuel supply pressure to the fuel injection valve is the same between the first fuel injection valve 101 and the second fuel injection valve 102, the fuel injection amount from the second fuel injection valve 102 per unit time is smaller than the fuel injection amount from the first fuel injection valve 101 per unit time.

With the above configuration (7), by causing the injection pressure of the second fuel injection valve 102 to be higher than the injection pressure of the first fuel injection valve 101 at high load, it is possible to suppress the difference between the fuel injection amount from the second fuel injection valve 102 per unit time and the fuel injection amount from the first fuel injection valve 101 per unit time at high load. Therefore, it becomes easy to secure the required fuel injection amount at high load.

(8) In some embodiments, in any one of the above configurations (1) to (7), the control device 13 is configured to perform control so as to decide on the any fuel injection valve of the first fuel injection valve 101 and the second fuel injection valve 102 to inject fuel, according to a fuel injection timing.

With the above configuration (8), for example, when performing the multi-stage injection which is often performed in the diesel engine, the fuel injection valve 100 having the more appropriate total hole area Sa can be selected according to the fuel injection timing, making it possible to obtain the appropriate fuel spray state at each fuel injection timing.

(9) In some embodiments, in any one of the above configurations (1) to (8), the above-described at least one piston 30 includes a first piston 31, and a second piston 32 disposed in the same cylinder 20 as the cylinder 20 where the first piston 31 is disposed, the second piston 32 being disposed opposite to the first piston 31.

With the above configuration (9), in the opposed-piston engine in which the two pistons 30 are disposed opposite to each other in the same cylinder 20, it is possible to improve the thermal efficiency of the engine 1 under the wide range of operating conditions from low load to high load.

(10) An engine 1 according to at least one embodiment of the present disclosure includes at least one cylinder 20, a first piston 31 disposed in the above-described at least one cylinder 20, and a second piston 32 disposed in the same cylinder 20 as the cylinder 20 where the first piston 31 is disposed, the second piston 32 being disposed opposite to the first piston 31. The engine 1 according to at least one embodiment of the present disclosure includes a plurality of fuel injection valves 100 disposed on the above-described at least one cylinder 20, the plurality of fuel injection valves 100 including a first fuel injection valve 101 and a second fuel injection valve 102. The engine 1 according to at least one embodiment of the present disclosure includes a control device 13 for controlling the first fuel injection valve 101 and the second fuel injection valve 102. The control device 13 is configured to control the first fuel injection valve 101 and the second fuel injection valve 102 such that fuel is injected from both the first fuel injection valve 101 and the second fuel injection valve 102 at high load of the engine 1. The control device 13 is configured to control the first fuel injection valve 101 and the second fuel injection valve 102 such that fuel injection from the first fuel injection valve 101 is stopped and the fuel is injected from the second fuel injection valve 102 at low load of the engine 1.

With the above configuration (10), since fuel is injected from both the first fuel injection valve 101 and the second fuel injection valve 102 at high load, it is possible to shorten the fuel injection period as compared to the case where fuel is injected from one of the first fuel injection valve 101 or the second fuel injection valve 102, and since it is possible to shorten the combustion period, it is possible to improve thermal efficiency.

With the above configuration (10), since fuel is injected from the second fuel injection valve 102 without injecting fuel from the first fuel injection valve 101, it is possible to lengthen the fuel injection period as compared to the case where fuel is injected from both the first fuel injection valve 101 and the second fuel injection valve 102. Thus, by lengthening the fuel injection period at low load, it is possible to stabilize the spray state to stabilize the combustion state while suppressing excessive fuel injection.

REFERENCE SIGNS LIST

1 Engine
13 Control device (ECU)
15 Fuel pump
17 Common rail
20 Cylinder
30 Piston
31 First piston
32 Second piston
100 Fuel injection valve
101 First fuel injection valve
102 Second fuel injection valve

The invention claimed is:

1. An engine, comprising:
a cylinder;
at least one piston disposed in the cylinder;
a plurality of fuel injection valves disposed on the cylinder, the plurality of fuel injection valves including a first fuel injection valve having a predetermined total hole area and a second fuel injection valve having a total hole area smaller than the total hole area of the first fuel injection valve; and
a control device for controlling the first fuel injection valve and the second fuel injection valve according to a load of the engine,
wherein the engine includes at least two cylinders, and
wherein the at least two cylinders are configured such that a cylinder total hole area, which is a sum of the total hole area of the first fuel injection valve and the total hole area of the second fuel injection valve, is different for each of the at least two cylinders.

2. The engine according to claim 1,
wherein the control device is configured to:
control the first fuel injection valve and the second fuel injection valve such that fuel is injected from both the first fuel injection valve and the second fuel injection valve at high load of the engine; and
control the first fuel injection valve and the second fuel injection valve such that fuel injection from the first fuel injection valve is stopped and fuel is injected from the second fuel injection valve at low load of the engine.

3. The engine according to claim 2,
wherein the control device is configured to increase an injection pressure of the second fuel injection valve at the high load relative to at the low load.

4. The engine according to claim 1,
wherein the control device is configured to control the first fuel injection valve and the second fuel injection valve in each of the at least two cylinders, according to the load.

5. The engine according to claim 4,
wherein the control device is configured to perform control so as to decide on any of the first fuel injection valve and the second fuel injection valve in each of the at least two cylinders to inject fuel or to stop injecting fuel, according to the load.

6. An engine, comprising:
a cylinder;
at least one piston disposed in the cylinder;
a plurality of fuel injection valves disposed on the cylinder, the plurality of fuel injection valves including a first fuel injection valve having a predetermined total hole area and a second fuel injection valve having a total hole area smaller than the total hole area of the first fuel injection valve,
a control device for controlling the first fuel injection valve and the second fuel injection valve according to a load of the engine,
a first fuel pump for supplying fuel to the first fuel injection valve; and
a second fuel pump for supplying fuel to the second fuel injection valve,
wherein the engine includes at least two cylinders,
wherein the control device is configured to control the first fuel injection valve and the second fuel injection valve in each of the at least two cylinders, according to the load, and
wherein the control device is configured to control the first fuel pump and the second fuel pump to increase a pressure of fuel supplied to the first fuel injection valve and the second fuel injection valve as the load increases, and is configured to control the first fuel pump and the second fuel pump to cause the pressure of fuel supplied to the second fuel injection valve to be higher than the pressure of fuel supplied to the first fuel injection valve at high load.

7. An engine, comprising:
a cylinder;
at least one piston disposed in the cylinder;
a plurality of fuel injection valves disposed on the cylinder, the plurality of fuel injection valves including a first fuel injection valve having a predetermined total hole area and a second fuel injection valve having a total hole area smaller than the total hole area of the first fuel injection valve; and
a control device for controlling the first fuel injection valve and the second fuel injection valve according to a load of the engine, wherein the control device is configured to perform control so as to decide on the any fuel injection valve of the first fuel injection valve and the second fuel injection valve to inject fuel, according to a fuel injection timing, when performing multi-stage injection.

8. The engine according to claim 1,
wherein the at least one piston includes a first piston, and a second piston disposed in the same cylinder as the cylinder where the first piston is disposed, the second piston being disposed opposite to the first piston.

9. The engine according to claim 6,
wherein the control device is configured to perform control so as to decide on any of the first fuel injection valve and the second fuel injection valve in each of the at least two cylinders to inject fuel or to stop injecting fuel, according to the load.

10. The engine according to claim 7,
wherein the control device is configured to perform control so as to decide on any of the first fuel injection valve and the second fuel injection valve in each of the at least two cylinders to inject fuel or to stop injecting fuel, according to the load.

11. The engine according to claim 6,
wherein the at least one piston includes a first piston, and a second piston on disposed in the same cylinder as the cylinder where the first piston is disposed, the second piston being disposed opposite to the first piston.

12. The engine according to claim 7,
wherein the at least one piston includes a first piston, and a second piston disposed in the same cylinder as the cylinder where the first piston is disposed, the second piston being disposed opposite to the first piston.

* * * * *